United States Patent
Oguri

(10) Patent No.: US 8,614,800 B2
(45) Date of Patent: Dec. 24, 2013

(54) IMAGE PROCESSING DEVICE DISPLAYING JOBS IN TWO AREAS OF DISPLAY

(75) Inventor: Hirofumi Oguri, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1224 days.

(21) Appl. No.: 11/947,036

(22) Filed: Nov. 29, 2007

(65) Prior Publication Data

US 2008/0130052 A1 Jun. 5, 2008

(30) Foreign Application Priority Data

Nov. 30, 2006 (JP) ................................. 2006-323919

(51) Int. Cl.
*G06F 3/12* (2006.01)

(52) U.S. Cl.
USPC .......... 358/1.13; 358/1.15; 358/1.16; 399/81; 715/700

(58) Field of Classification Search
USPC ........ 358/1.13, 1.1, 1.15, 1.16; 345/104, 501; 348/107, 51; 355/53; 386/230; 399/111, 81; 715/700, 803, 808
See application file for complete search history.

(56) References Cited

U.S. PATENT DOCUMENTS

| | | | | |
|---|---|---|---|---|
| 4,636,848 A | * | 1/1987 | Yamamoto | 348/107 |
| 4,983,832 A | * | 1/1991 | Sato | 250/310 |
| 5,167,013 A | * | 11/1992 | Hube et al. | 358/1.11 |
| 5,734,915 A | * | 3/1998 | Roewer | 715/202 |
| 6,421,509 B1 | * | 7/2002 | Nomura et al. | 399/81 |
| 2002/0030840 A1 | | 3/2002 | Itaki et al. | |
| 2002/0191028 A1 | * | 12/2002 | Senechalle et al. | 345/800 |
| 2003/0214679 A1 | | 11/2003 | Ishikawa | |
| 2004/0012802 A1 | * | 1/2004 | Allen et al. | 358/1.13 |
| 2004/0027611 A1 | * | 2/2004 | Leiman et al. | 358/1.15 |
| 2004/0201860 A1 | * | 10/2004 | Nakaoka et al. | 358/1.1 |
| 2005/0041262 A1 | * | 2/2005 | Aoki | 358/1.13 |
| 2005/0108679 A1 | * | 5/2005 | Jensen et al. | 717/101 |
| 2005/0254080 A1 | * | 11/2005 | Kim | 358/1.13 |
| 2006/0050313 A1 | * | 3/2006 | Hashimoto et al. | 358/1.15 |
| 2006/0114509 A1 | | 6/2006 | Itaki et al. | |
| 2006/0132845 A1 | | 6/2006 | Itaki et al. | |
| 2007/0121150 A1 | * | 5/2007 | Kobayashi et al. | 358/1.15 |

FOREIGN PATENT DOCUMENTS

| | | |
|---|---|---|
| JP | H09-008980 A | 1/1997 |
| JP | 2002-166630 A | 6/2002 |
| JP | 2002-344678 A | 11/2002 |
| JP | 2002368927 A | 12/2002 |
| JP | 2003-283734 A | 10/2003 |
| JP | 2007-150579 A | 6/2007 |

OTHER PUBLICATIONS

Japan Patent Office, Office Action for Japanese Patent Application No. 2007-302599 (counterpart to above-captioned patent application), mailed Sep. 6, 2011.

\* cited by examiner

*Primary Examiner* — King Poon
*Assistant Examiner* — David S Cammack
(74) *Attorney, Agent, or Firm* — Baker Botts L.L.P.

(57) ABSTRACT

An image processing device is capable of executing a job that outputs image information to a destination. The image processing device includes a display, a first memory, a second memory, and a first display control unit. The first memory stores, as an uncompleted job, a job before execution. The second memory stores, as a completed job, the job after the uncompleted job has been executed. The first display control unit displays both the uncompleted job stored in the first memory and the completed job stored in the second memory on the display simultaneously.

13 Claims, 14 Drawing Sheets

| COMPLETED JOB | | | | UNCOMPLETED JOB | |
|---|---|---|---|---|---|
| 1 Copy | OK | A4 | 10 copies | ←←← 1 FAX Executing | ○ Johnson |
| 2 Print | OK | A4 | 10 copies | 2 FAX | ▼▼ Williams |
| 3 Scanner | OK | ▲ Davis | | 3 FAX | ○○ Smith |
| | | | | 4 FAX | Electronics Shop Tokyo Branch |
| | | | | 5 FAX | ○○ Noodle Shop |

| PHONE BOOK DATA | | FAX DESTINATION | |
|---|---|---|---|
| ○○ Smith | 052-123-4561 | ▼▼ Williams | 052-123-4513 |
| ○○ Brown | 052-123-4562 | ○○ Smith | 052-123-4561 |
| ○ Johnson | 052-123-4563 | Electronics Shop | |
| Electronics Shop | |     Tokyo Branch | 052-123-4511 |
|     Tokyo Branch | 052-123-4511 | ○○ Noodle Shop | 052-123-4512 |
| ○○ Noodle Shop | 052-123-4512 | | |
| ▼▼ Williams | 052-123-4513 | | |
| ○×▼ Shop | 052-123-4514 | | |

| COMPLETED JOB | | | | UNCOMPLETED JOB | | |
|---|---|---|---|---|---|---|
| 1 Copy | OK | A4 | 10 copies | ←←← 1 FAX | Executing | ○ Johnson |
| 2 Print | OK | A4 | 10 copies | 2 FAX | | ▼▼ Williams |
| 3 Scanner | OK | ▲ Davis | | 3 FAX | | ○○ Smith |
| | | | | 4 FAX | | Electronics Shop Tokyo Branch |
| | | | | 5 FAX | | ○○ Noodle Shop |

41A      41B

| COMPLETED JOB | | | | UNCOMPLETED JOB | | |
|---|---|---|---|---|---|---|
| 1 Copy | OK | A4 | 10 copies | ←←← 1 FAX | Executing | ▼▼ Williams |
| 2 Print | OK | A4 | 10 copies | 2 FAX | Re-1 | ○ Johnson |
| 3 Scanner | OK | ▲ Davis | | 3 FAX | | ○○ Smith |
| | | | | 4 FAX | | Electronics Shop Tokyo Branch |
| | | | | 5 FAX | | ○○ Noodle Shop |

| COMPLETED JOB | UNCOMPLETED JOB |
|---|---|
| 1 Copy　　OK　　A4　10 copies | ←←← 1 FAX　Executing　○○ Smith |
| 2 Print　　OK　　A4　10 copies | 2 FAX　Re-2　○ Johnson |
| 3 Scanner　OK　　▲ Davis | 3 FAX　　　　　　Electronics Shop |
| 4 FAX　　OK　　▼▼ Williams |　　　　　　　　　　　Tokyo Branch |
|  | 4 FAX　　　　　　○○ Noodle Shop |

| COMPLETED JOB | UNCOMPLETED JOB |
|---|---|
| 1 Copy　　OK　　A4　10 copies | ←←← 1 FAX　Executing　○○ Smith |
| 2 Print　　OK　　A4　10 copies | 2 FAX　　　　　　Electronics Shop |
| 3 Scanner　OK　　▲ Davis |　　　　　　　　　　　Tokyo Branch |
| 4 FAX　　OK　　▼▼ Williams | 3 FAX　　　　　　○○ Noodle Shop |
|  | 4 FAX　Re-2　○ Johnson |

41A　　　　　　　　　　　　　　　　41B

| COMPLETED JOB | | | UNCOMPLETED JOB | | |
|---|---|---|---|---|---|
| 1 Copy | OK | A4  10 copies | ←←← 1 FAX | Executing | ○○ Smith |
| 2 Print | OK | A4  10 copies | 2 FAX | | Electronics Shop Tokyo Branch |
| 3 Scanner | OK | ▲ Davis | 3 FAX | | ○○ Noodle Shop |
| 4 FAX | OK | ▼▼ Williams | 4 FAX | Re-2 | ○ Johnson |

41A     41B

| COMPLETED JOB | | | | UNCOMPLETED JOB | | | |
|---|---|---|---|---|---|---|---|
| 1 Copy | OK | A4 | 10 copies | ←←← 1 FAX | Executing | ○○ Smith | |
| 2 Print | OK | A4 | 10 copies | 2 FAX | | ○○ Noodle Shop | |
| 3 Scanner | OK | ▲ Davis | | 3 FAX | Re-2 | ○ Johnson | |
| 4 FAX | OK | ▼▼ Williams | | | | | |

41A  41B

IMAGE PROCESSING DEVICE DISPLAYING JOBS IN TWO AREAS OF DISPLAY

CROSS REFERENCE TO RELATED APPLICATION

This application claims priority from Japanese Patent Application No. 2006-323919 filed Nov. 30, 2006. The entire content of the priority application is incorporated herein by reference.

TECHNICAL FIELD

The present invention relates to an image processing device capable of transmitting image information to an output destination, and more particularly to an image processing device capable of displaying two different screens simultaneously.

BACKGROUND

Conventionally, in an image processing device incorporating copying function, facsimile function, printer function and scanner function integrally, image information inputted via a scanner or network is stored as a job temporarily in a memory after having been designated an output destination, and is outputted sequentially when any of the above functions is performed. When a plurality of jobs are accumulated in the memory, the execution status of each job is displayed by a user on a display, provided in the image processing device, to confirm the sequence of the plurality of jobs or to confirm the execution results of the jobs. For example, Japanese Patent Application Publication No. 2002-368927 discloses a job display device displaying in real time the states of completion and generation of jobs on a display that a user watches.

SUMMARY

However, the job display device according to Japanese Patent Application Publication No. 2002-368927 displays only either of an uncompleted job or a completed job. Therefore, when one image information is designated with a plurality of output destinations, output destinations, to which the image information has been already outputted, and output destinations, to which the image information has not been outputted yet, must be confirmed on different screens respectively. As a result thereof, it is necessary to switch screens, thereby causing delays.

In view of the foregoing, it is an object of the present invention to provide an image processing device having improved operability and operation efficiency.

In order to attain the above and other objects, the invention provides an image processing device that is capable of executing a job that outputs image information to a destination. The image processing device includes a display, a first memory, a second memory, and a first display control unit. The first memory stores, as an uncompleted job, a job before execution. The second memory stores, as a completed job, the job after the uncompleted job has been executed. The first display control unit displays both the uncompleted job stored in the first memory and the completed job stored in the second memory on the display simultaneously.

According to another aspect, the invention also provides an image processing device that is capable of executing a job that outputs image information to a destination. The image processing device includes a display, a memory, a designating unit, a display control, and an output unit. The memory stores a plurality of destinations to be outputted the image information. The designating unit designates at least one destination from the plurality of destinations displayed on the display. The display control unit displays both the plurality of destinations and the at least one destination designated by the designating unit simultaneously. The output unit outputs the image information to the at least one destination designated by the designating unit.

BRIEF DESCRIPTION OF THE DRAWINGS

FIG. 9 is a view showing the liquid crystal display after a plurality of facsimile destinations have been selected from the phone book data;

FIG. 10 is a view showing the liquid crystal display on which both of completed jobs and uncompleted jobs are displayed simultaneously;

FIG. 14 is a view showing the liquid crystal display after a job for changing the execution sequence has been selected;

FIG. 15 is a view showing the liquid crystal display after the execution sequence of jobs has been changed;

DETAILED DESCRIPTION

Figure 1:
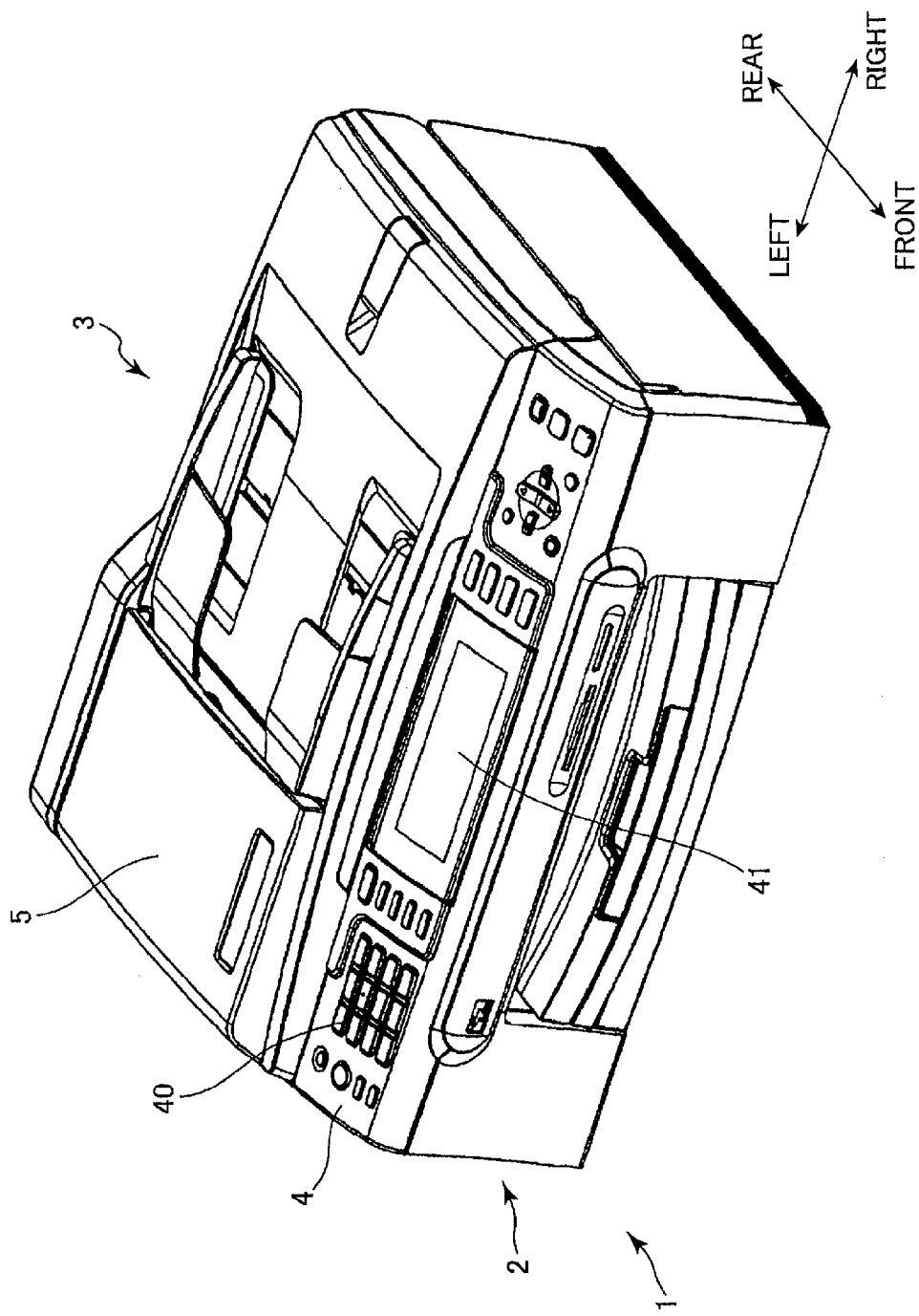
FIG. 1 is a perspective view showing an image processing device according to an embodiment of the present invention.

Next, a preferred embodiment of the present invention will be described with reference to the accompanying drawings. FIG. 1 shows a perspective view showing an outer structure of an image processing device 1 according to an embodiment of the present invention. The image processing device 1 is a multi-functional device provided with a printer unit 2 in the lower portion thereof and a scanner unit 3 in the upper portion thereof integrally. The terms "right", "left", "front", "rear" and the like will be used throughout the description assuming that the image processing device 1 is disposed in an orientation in which it is intended to be used.

The image processing device 1 includes a network printer function, a scanner function, a facsimile function and a copying function integrally. Using the network printer function, image data is received from a PC via a network to print out the received image data by the printer unit 2. Using the scanner function, image data scanned by the scanner unit 3 is transmitted to the PC. Using the facsimile function, image data scanned by the scanner unit 3 is transmitted to another facsimile terminal (not shown), and image data transmitted from another facsimile terminal is received to print out the image data by the printer unit 2. Using the copying function, image data scanned by the scanner unit 3 is printed out by the printer unit 2.

The image processing device 1 has an operation panel unit 4 for operating the printer unit 2 and the scanner unit 3 at an upper front surface thereof. The operation panel unit 4 includes various operation keys 40 and a liquid crystal display 41. The image processing device 1 is operated based on operational instructions from the operation panel unit 4. The image processing device 1 also includes an ADF 5 at the upper portion thereof. The ADF 5 feeds a plurality of documents set in the ADF 5 to the scanner unit 3 sequentially and ejects the plurality of documents scanned by the scanner unit 3.

Figure 2:
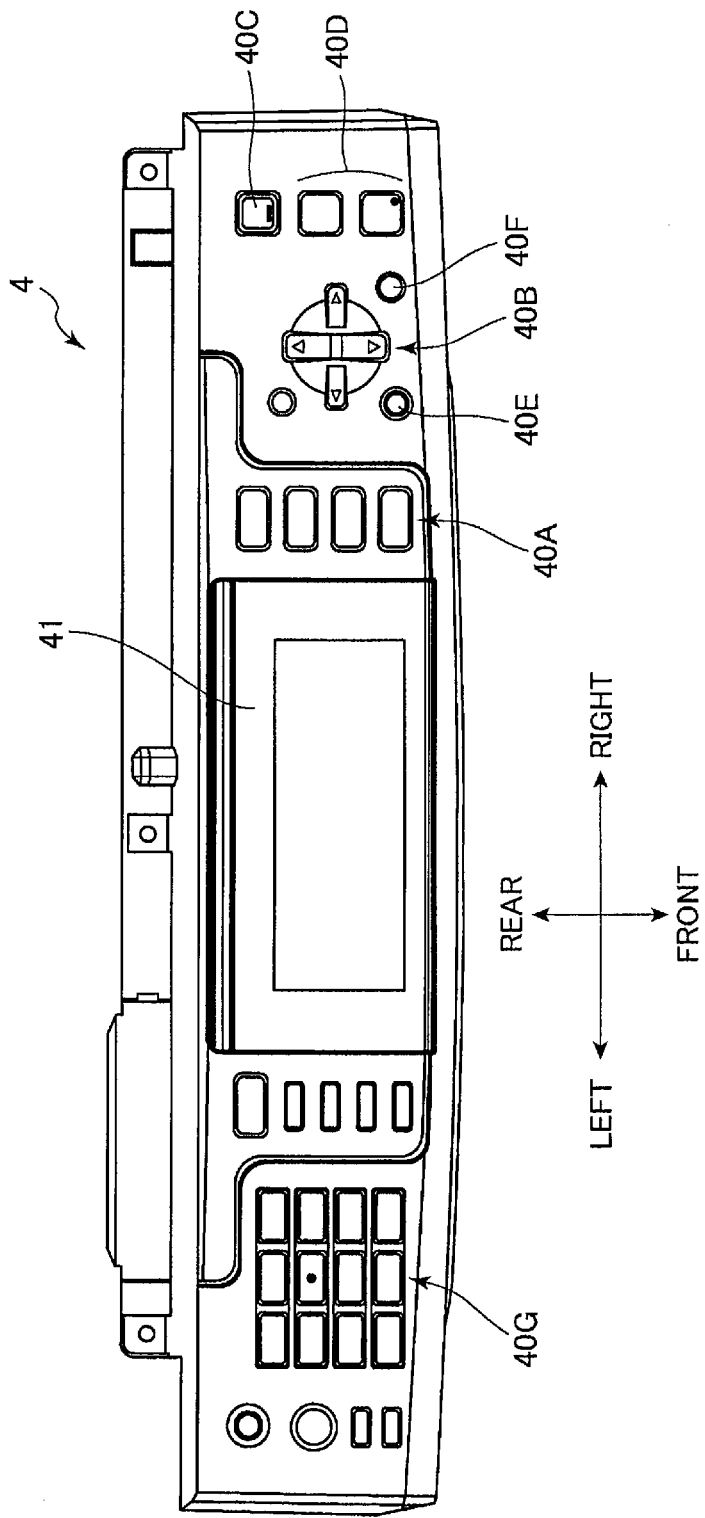
FIG. 2 is a plan view showing a configuration of an operation panel unit shown in FIG. 1.
Figures 12, 13:
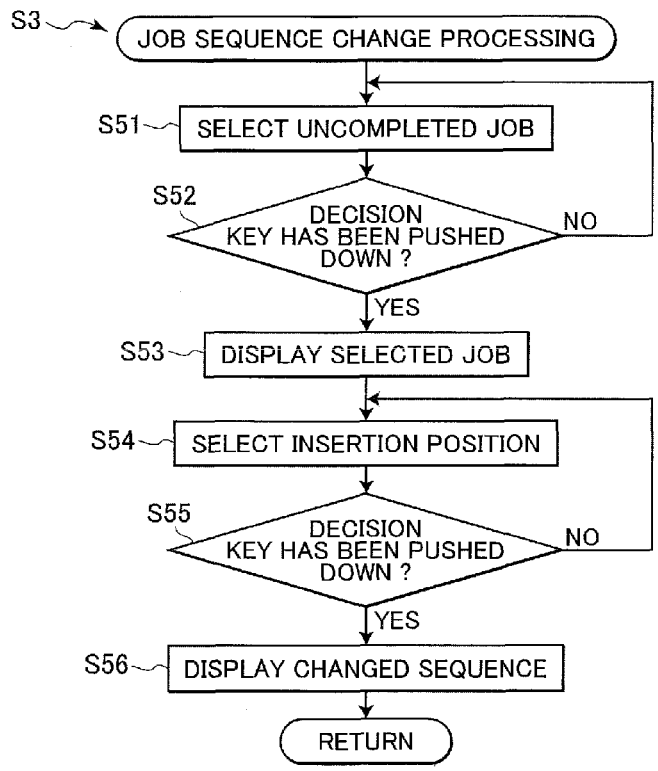
FIG. 12 is a view showing the liquid crystal display during a job execution processing.
FIG. 13 is a flowchart showing a sequence change processing of the uncompleted jobs shown in FIG. 4.

FIG. 2 is a plan view showing a configuration of an operation panel unit 4. As shown in FIG. 2, the operation panel unit 4 includes various operation keys 40A through 40G and the liquid crystal display 41. As shown in FIG. 2, the liquid crystal display 41 has a substantially rectangular shape in a plan view. A width of the liquid crystal display 41 in the left-to-right direction is longer than a width of the liquid crystal display 41 in the front-to- rear direction. The operation keys 40a through 40G are arranged on the periphery of the liquid crystal display 41. The operation keys 40A through 40F are provided on the right section of the operation panel unit 4 and a numeric keypad 40G is provided on the left section of the operation panel unit 4. As shown in FIG. 12, the liquid crystal display 41 is capable of dividing a first display region 41A and a second display region 41B in half in a longitudinal direction (the left-to-right direction). Therefore, the first display region 41A is the same size as the second display region 41B.

The mode keys 40A are used to switch the modes of the scanner function, facsimile function and copying function of the image processing device 1. The cursor key 40B is used to move the positions of targets for instructions and operations. The stop/end key 40C is used to stop operations or to end settings. Further, in the present embodiment, the stop/end key 40C is used to stop uncompleted job. The start keys 40D are used to copy or scan a document. One of the start keys 40D is pushed down to start color copying and color scanning. The other of the start keys 40D is pushed down to start monochrome copying and monochrome scanning. Further, in the present embodiment, the start keys 40D are used to retransmit completed facsimile job. The clear/back key 40E is used to cancel setting contents or to erase a character in the cursor position when characters are inputted. The decision key 40F is used to set functions or to decide the set functions. The numeric keypad 40G is composed of a total of 12 code keys including 10 numeric keys of 0 to 9 and two keys of * and #.

Figure 3:
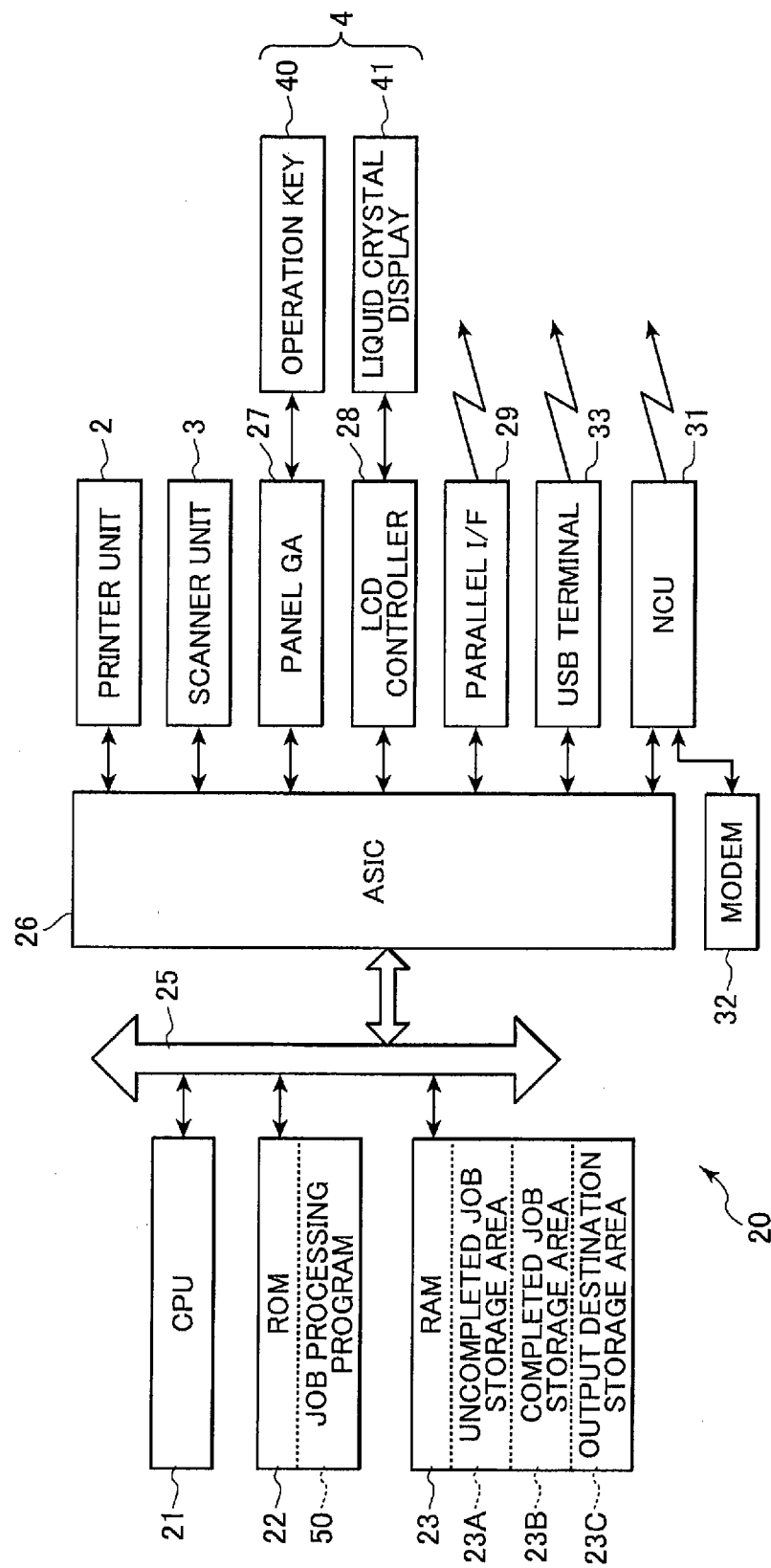
FIG. 3 is a view showing a configuration of a controlling unit of the image processing device according to the embodiment of the present invention.

FIG. 3 is a view showing the configuration of a controlling unit 20 of the image processing device 1 according to an embodiment of the present invention. The controlling unit 20 controls the operations of the image processing device 1 including the printer unit 2, scanner unit 3 and operation panel unit 4 as a whole. As shown in FIG. 3, the controlling unit 20 is configured as a microcomputer mainly including a CPU 21, ROM 22 and RAM 23 and is connected to an ASIC 26 via a bus 25.

The ROM 22 stores various control programs for controlling the printer function, scanner function, facsimile function and copying function respectively, and constants and tables used in the central programs. The ROM 22 also stores a job processing program 50 for controlling a job processing function. The CPU 21 performs acceptance of job, execution of job, sequence change of job, re-execution of job and stop of job according to the job processing program 50.

The RAM 23 includes a work area, an uncompleted job storage area 23A, a completed job storage area 23B and an output destination storage area 23C. The work area temporarily stores variables and parameters when the CPU 21 executes the control program. The uncompleted job storage area 23A stores uncompleted job processed by the job processing program 50. The completed job storage area 23B stores, as a completed job, a job after an uncompleted job has been executed. The output destination storage area 23C stores phone numbers and addresses as data in advance. These phone numbers and addresses are output destinations of facsimile data and scan data.

The ASIC 26 controls the operations of the printer unit 2 and scanner unit 3 in accordance with instructions from the CPU 21. The operations of a motor driving the printer unit 2, an ink jet recording head, another motor driving the scanner unit 3 and an image scanner unit are controlled by the controlling unit 20.

The ASIC 26 is connected to a panel gate array (panel GA) 27 for controlling the operation keys 40A to 40G used for inputting desired instructions to the image processing device 1. The panel GA 27 detects any of the pushed down operation keys 40A to 40G and outputs a predetermined corresponding key code. Predetermined corresponding key codes are allocated to the plurality of operation keys 40A to 40G respectively. When the CPU 21 receives any predetermined corresponding key code from the panel GA 27, the CPU 21 performs control processing to be executed according to a predetermined key processing table. The key processing table is created as a table by homologizing key codes and control processing and is stored, for example, in the ROM 22.

The ASIC 26 is also connected to a LCD controller 28 for controlling the liquid crystal display 41. The LCD controller 28 displays information about the operations of the printer unit 2 or scanner unit 3, output destination information, uncompleted job and completed job on the liquid crystal display 41 based on instructions of the CPU 21.

The CPU 21 stores information displayed on the liquid crystal display 41 to three display memories (not shown). The three display memories correspond to the three primary colors of RGB respectively.

Moreover, the ASIC 26 is connected to a parallel interface (I/F) 29 and a USB terminal 33 for transmitting and receiving data via a computer and a parallel cable or USB cable. Further, the ASIC 26 is connected to a NCU (Network Control Unit) 31 and a modem 32 for executing a facsimile function.

Figure 4:
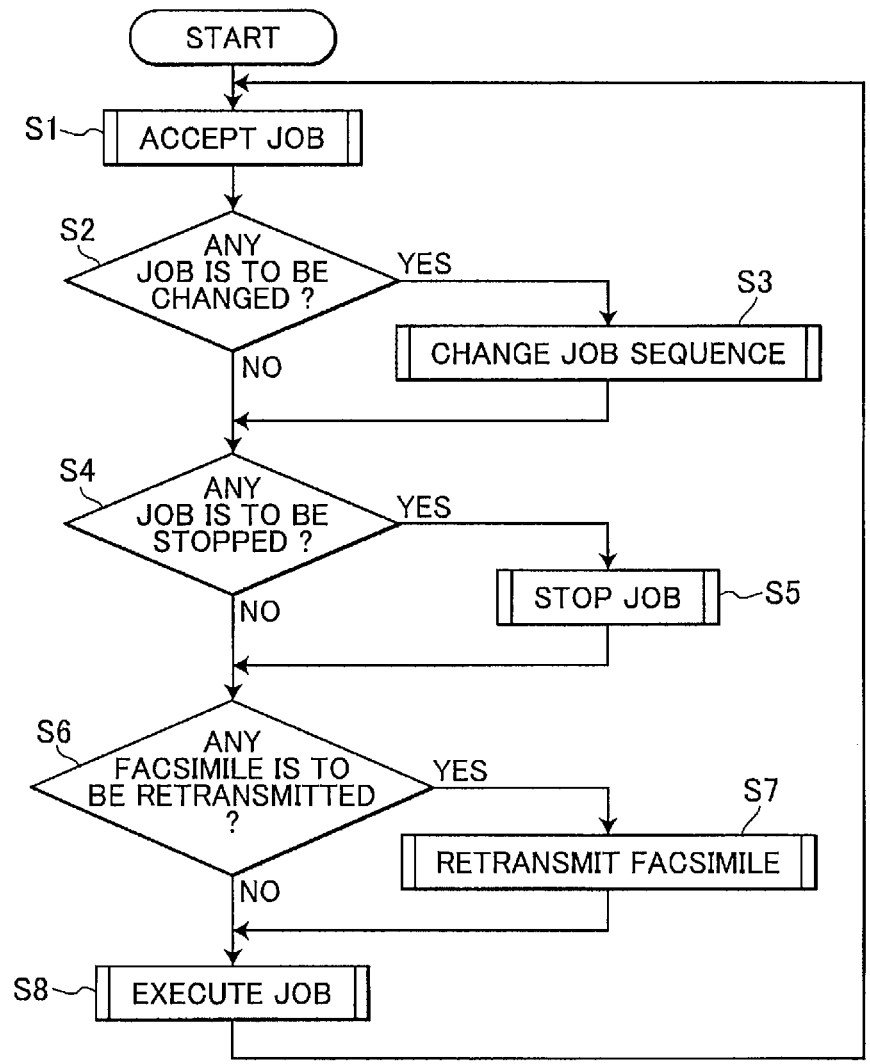
FIG. 4 is a flowchart showing the entire processing of a job processing program of the image processing device according to the embodiment of the present invention.

Next, the job processing program 50 will be described with reference to FIG. 4. FIG. 4 is a flowchart showing the entire processing of the job processing program 50. In the respective steps of the job processing program 50, the acceptance of job, sequence change of jobs, re-execution of job, stop of job, and execution of job are performed. The job processing program 50 is repeated when the image processing device 1 is turned on.

First in S1, when a user has pushed down any of the mode keys 40A on the operation panel 4, the panel GA 27 detects whether the pushed down key is a scanner mode key, a facsimile mode key or a copy mode key, and the CPU 21 begins the acceptance of job for detected mode. A processing for the acceptance of job will be described later. The job accepted in S1 is stored as an uncompleted job in the uncompleted job storage area 23A (see FIG. 3).

Next, in S2 the CPU 21 determines whether or not a job sequence change key (not shown) is pressed. A process for the sequence change of jobs will be described in detail later. Then, when the job sequence change key is pressed (S2: YES), the CPU 21 advances to S3. In S3 the CPU 21 performs the process for the sequence change of jobs. When the job sequence change key is not pressed (S2: NO), the CPU 21 advances to S4. In S4 the CPU 21 determines whether or not a job stop key (not shown) is pressed. When the job stop key is pressed (S4: YES), the CPU 21 advances to S5. In S5 the CPU 21 performs a process for the stop of job. When the job stop key is not pressed (S4: NO), the CPU 21 advances to S6.

In S6 the CPU 21 determines whether or not a re-execution key (not shown) is pressed. The re-execution key is pressed when the user desires to re-execute a completed job. In the present embodiment, the re-execution for a completed job indicates a retransmission of a transmitted facsimile. When the re-execution key is pressed (S6: YES), the CPU 21 advances to S7. In S7 the CPU 21 retransmits a transmitted facsimile. A process for the retransmission of the transmitted facsimile will be described in detail later. When the re-execution key is not pressed (S6: NO), the CPU 21 advances to S8. In S8 the CPU 21 starts an execution of uncompleted job. When the uncompleted job is scanning, a transmission operation to a designated PC is performed. When the uncompleted job is facsimile transmission, a transmission operation to another designated facsimile terminal is performed. When the uncompleted job is printing or copying, a printing operation is performed. The CPU 21 returns to S1 after completing the execution of the uncompleted job.

Figure 5:
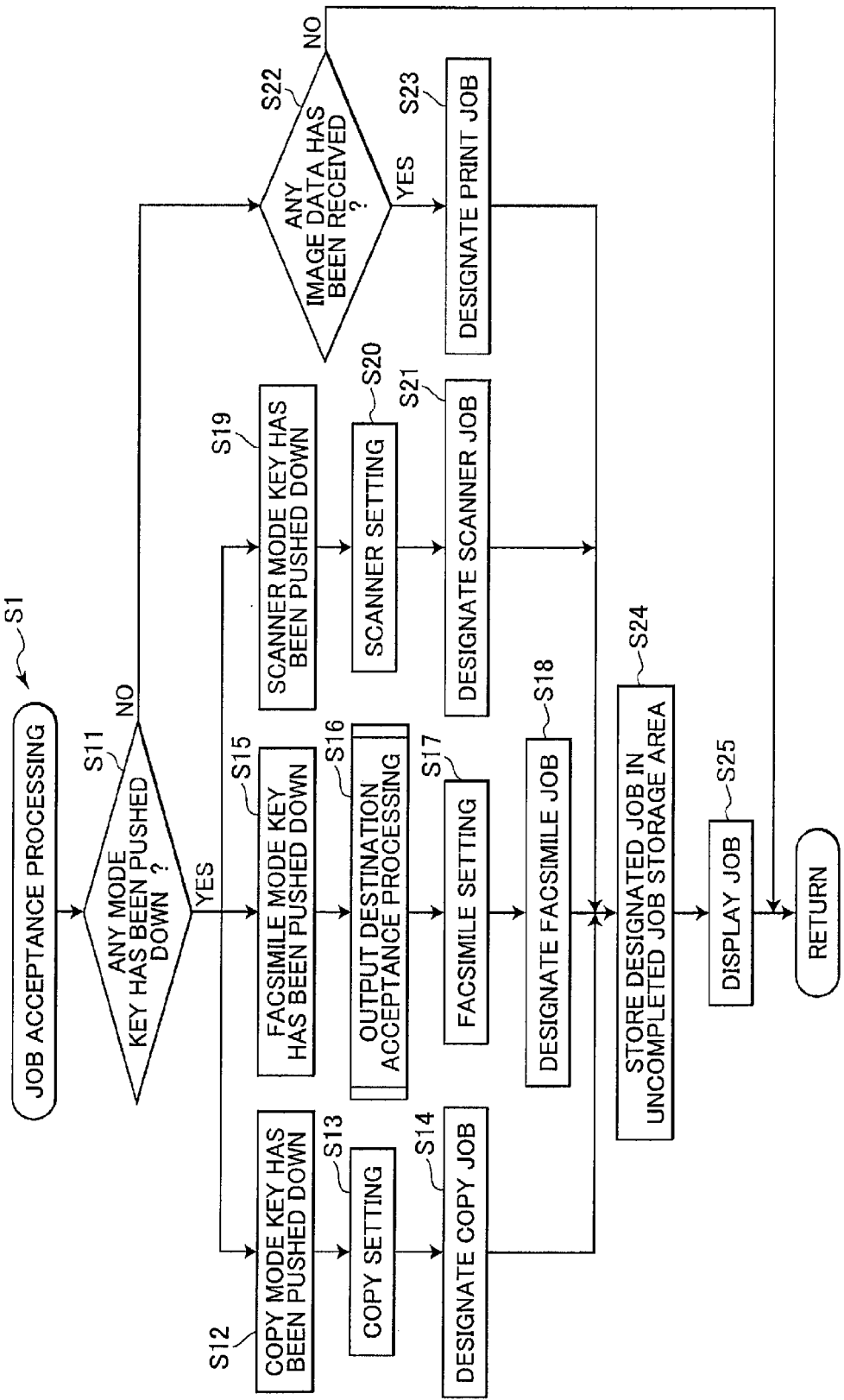
FIG. 5 is a flowchart showing a job acceptance processing shown in FIG. 4.
Figure 6:
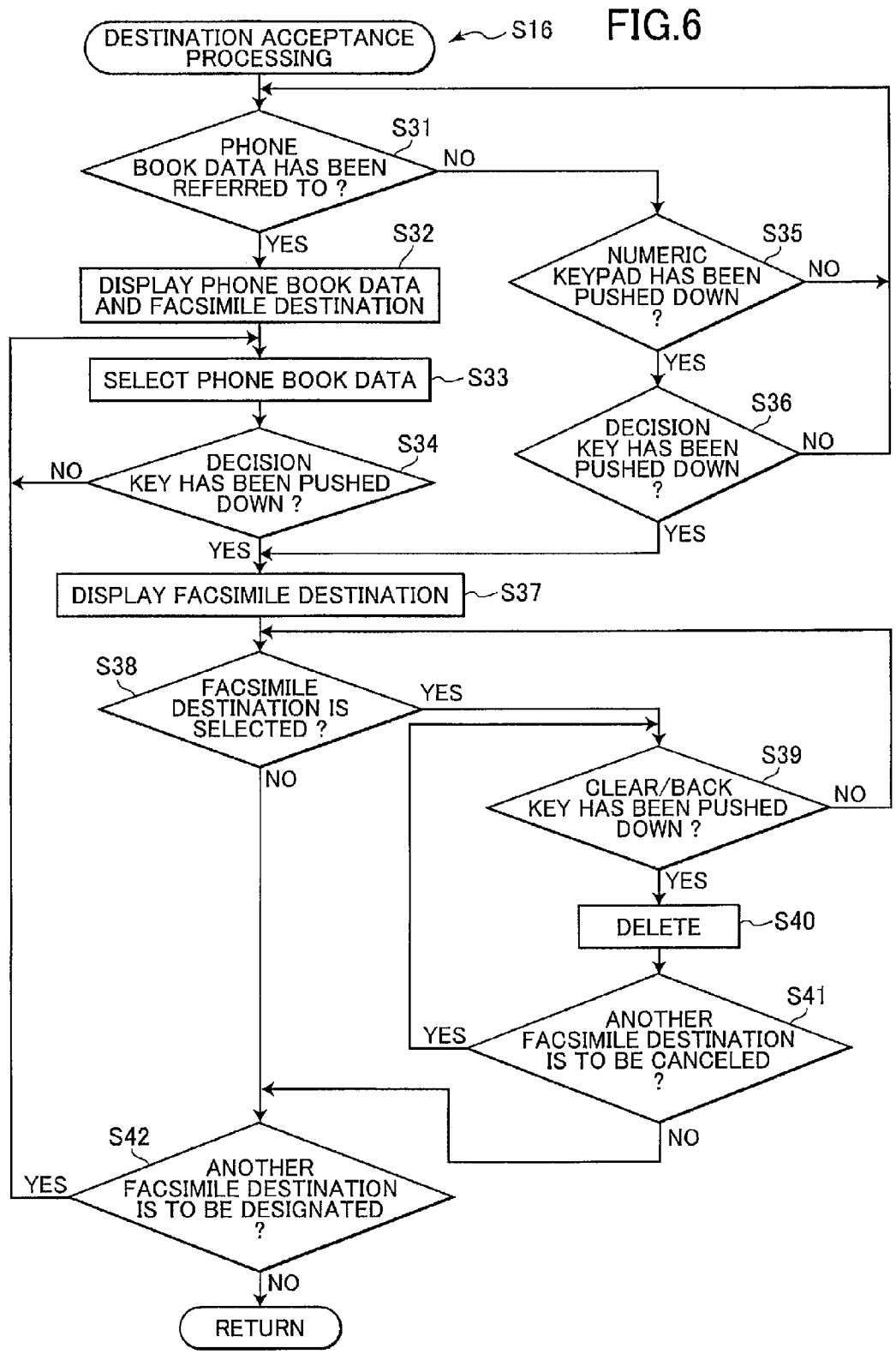
FIG. 6 is a flowchart showing a facsimile destination acceptance processing shown in FIG. 5.
Figure 7:
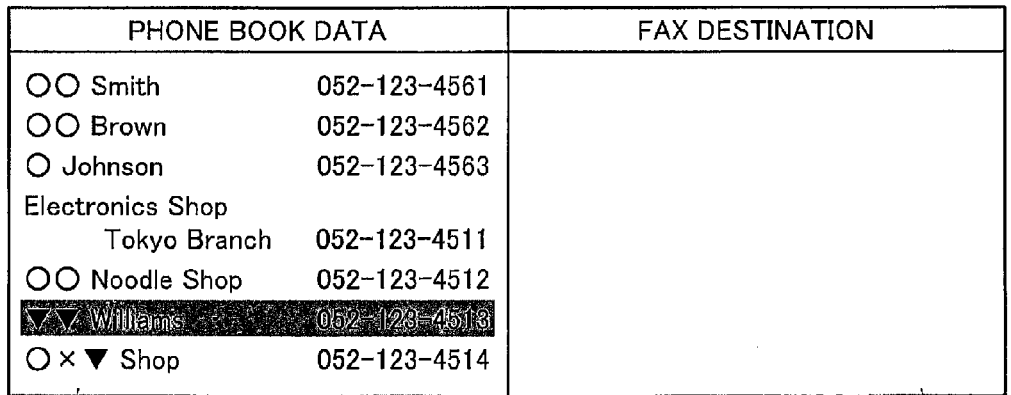
FIG. 7 is a view showing a liquid crystal display when a facsimile destination is selected from phone book data.
Figure 8:
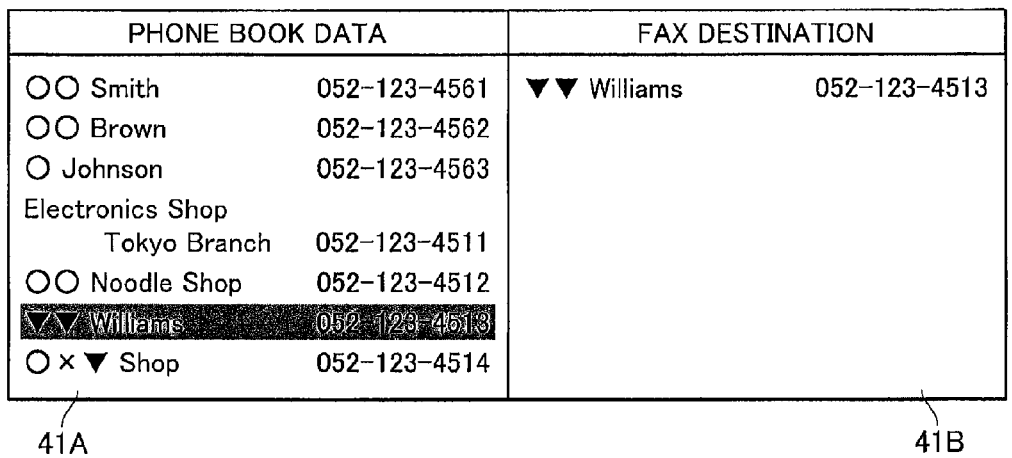
FIG. 8 is a view showing the liquid crystal display after one facsimile destination has been selected from the phone book data.

Next, a process for the acceptance of job in S1 of FIG. 4 will be described with reference to FIGS. 5 through 9. FIG. 5 is a flowchart showing a job acceptance processing. FIG. 6 is a flowchart showing a facsimile destination acceptance processing. FIG. 7 is a view showing the liquid crystal display 41 when a facsimile destination is selected from phone book data stored in the output destination storage area 23C. FIG. 8 is a view showing the liquid crystal display 41 after one facsimile destination has been selected from the phone book data. FIG. 9 is a view showing the liquid crystal display 41 after a plurality of facsimile destinations have been selected from the phone book data.

First, as shown in FIG. 5, in S11 the CPU 21 determines whether or not any of the mode keys 40A on the operation panel 4 has been pushed down. When the CPU 21 determines that none of the mode keys 40A has been pushed down (S11: NO), the CPU 21 advances to S22. In S22 the CPU 21 determines whether or not image data have been received from the PC via the network. When The CPU 21 determines that image data have been received (S22: YES), the CPU 21 advances to S23. In S23 the CPU 21 designates a print job so as to print the image data. On the other hand, when The CPU 21 determines that no image data have been received (S22: NO), the CPU 21 ends the job acceptance processing.

On the other hand, when the CPU 21 determines that any of the mode keys 40A has been pushed down (S11: YES), the panel GA 27 detects whether the pushed down key is a scanner mode key, a facsimile mode key or a copying mode key and transmits the result of the detection to the CPU 21. The CPU 21 initiates the acceptance of job for the detected mode. For example, in S12, when a user has pushed down the copy mode key, the image processing device 1 is switched to the copy mode. Accordingly, in S13 the user can configure copy settings for image quality, enlargement and reduction factor, recording paper type and number of sets. Subsequently, in S14, when the user has pushed down the start key 40D, a copy job is designated.

Moreover, in S19, when the user has pushed down the scanner mode key, the image processing device is switched to the scanner mode. Then, in S20, the user can configure a scanner setting for designating a personal computer used for storing scanned image data. Subsequently, in S21, when the user has pushed down the start key 40D, a scanner job is designated.

Moreover, in S15, when the user has pushed down the facsimile mode key, the image processing device is switched to the facsimile mode. Then, the user can configure a facsimile setting for a facsimile destination (S16) and a facsimile setting for image quality (S17). Subsequently, in S18, when the user has pushed down the start key 40D, a facsimile job is designated. Now, a destination acceptance processing will be described with reference to FIG. 6 and the liquid crystal display 41 when the user has pushed down the facsimile mode key and a destination acceptance processing will be described with reference to FIGS. 7 through 9.

First, as shown in FIG. 6, in S31 the CPU 21 determines whether or not a phone book key (not shown) has been pushed down by the user. When the CPU 21 determines that the phone book key has been pushed down (S31: YES), the CPU 21 calls up the phone book data stored in the output destination storage area 23C and allows the LDC controller 28 to display the phone book data on the liquid crystal display 41. Based on the instruction of the CPU 21, in S32 the LDC controller 28 displays both of the phone book data stored in the output destination storage area 23C on the first display region 41A and the facsimile destination data on the second display region 41B, simultaneously. In FIG. 7, a ground color in a portion, which "▼▼ Williams" is displayed, of the first display region 41A is different from a ground color in another portion of the screen. The ground color in the portion, which "▼▼ Williams" is displayed, indicates a position of the cursor as a target of operation.

Next, when the user pushes down the decision key 40F (S34: YES) after having pushed down the up-and-down buttons of the cursor key 40B to move the cursor and to select a destination desired to be designated as a facsimile destination from the phone book data (S33), in S37 the facsimile destination is displayed in a facsimile destination data display field (the second display region 41B) of the operation panel unit 4, as shown in FIG. 8. On the other hand, when the user has not pushed down the decision key 40F (S34: NO), the CPU 21 returns to a process for selecting the phone book data.

Next, in S38 the CPU 21 determines whether or not the user has moved the cursor from a phone book data display field (the first display region 41A) to the destination data display field (the second display region 41B) by pushing down the left-and-right buttons of the cursor key 40B. When determined that the cursor has not been moved (S38: NO), then in S42 the CPU 21 determines whether or not another facsimile destination is to be designated. When the user has moved the cursor within the phone book data display field by pushing down the cursor key 40B (S42: YES), the CPU 21 determines that the use is going to select a new facsimile destination and returns to S33. As shown in FIG. 9, when a plurality of facsimile destinations is designated as describe above, a plurality of destination data is displayed on the destination data display field. On the other hand, when the user has pushed down the decision key 40F without designating any facsimile destination (S42: NO), the destinations of the facsimile are fixed, resulting in the termination of the destination acceptance processing.

In the present embodiment, any designated destination may be canceled. When desiring to cancel a designated facsimile destination, the user moves the cursor from the phone book data display field to the destination data display field by pushing down the left-and-right buttons of the cursor key 40B (S38: YES). Subsequently, when the clear/back key 40E is pushed down (S39: YES), in S40 the destination data at the position of the cursor is canceled (deleted). Then the CPU 21 drives the LCD controller 28 to delete the destination data from the destination data display field. When the destination data has been deleted, the cursor returns to the phone book display field. On the other hand, when the user has not pushed down the clear/back key 40E (S39: NO), the CPU 21 returns to S38. The case where the user does not push down the clear/back key 40E includes that the user has moved the cursor from the destination data display field to the phone book data display field by pushing down the left-and-right buttons of the cursor key 40B.

Subsequently, in S41 the CPU 21 determines whether or not another facsimile destination is to be canceled. When the user has moved the cursor from the phone book data display field to the destination data display field by pushing down the cursor key 40B, the CPU 21 determines that another facsimile destination is to be canceled (S41: YES) and the CPU 21 returns to S39. When the user has pushed down the up-and-down buttons of the cursor key 40B in the phone book data display field, the CPU 21 determines that another facsimile destination is not to be canceled (S41: NO) and the CPU 21 advances to S42.

Moreover, in the present embodiment, the user can designate a facsimile destination by pushing down the numeric keypad 40G to input a phone number of a destination. In S31 of FIG. 6, when the user performs no operation of referring to the phone book (S31: NO), the CPU 21 determines whether or not the numeric keypad 40G has been pushed down (S35). When the numeric keypad 40G has not been pushed down (S35: NO), the CPU 21 returns to S31. On the other hand, when the CPU 21 determines that the numeric keypad 40G has been pushed down (S35: YES), the CPU 21 advances to S36. In S36 the CPU 21 determines whether or not the decision key 40F has not been pushed down. When determined that the decision key 40F has been pushed down (S36: YES), in S37 a facsimile destination that is inputted by the user is displayed in the destination data display field. When the CPU 21 determines that the numeric keypad 40G has not been pushed down (S36: NO), the CPU 21 returns to S31.

After the facsimile destination has been designated as described above, facsimile settings such as image quality are set (FIG. 5, S17). Subsequently, when the user pushes down the start key 40D, in S18 a facsimile job is designated.

After the job has been designated as described above, in S24 the CPU 21 stores the designated job as an uncompleted job to the uncompleted job storage area 23A. Next, uncompleted jobs stored in the uncompleted job storage area 23A, and completed jobs stored in the completed job storage area 23B are read out. Then, as shown in FIG. 10, in S25 the LCD controller 28 displays both of the uncompleted jobs and completed jobs at the same time on the liquid crystal display 41.

FIG. 10 is one example of the liquid crystal display 41 on which both of the uncompleted jobs and completed jobs are displayed at the same time. Similarly, when a copy job or a scanner job is designated, both of the uncompleted jobs and completed jobs are displayed at the same time after the designated job has been stored as an uncompleted job in the uncompleted job storage area 23A.

The uncompleted jobs shown in FIG. 10 are displayed sequentially according to an execution sequence of the jobs. In the case of the above designated jobs for multicast facsimile transmission (jobs for transmitting one facsimile document to a plurality of destinations) shown in FIG. 9, each job corresponding to each of the plurality of facsimile destinations is displayed in an uncompleted job display field (the second display region 41B) shown in FIG. 10. Accordingly, the facsimile destinations and the number of facsimiles to be transmitted can be confirmed easily. Moreover, the completed jobs are displayed in a completion sequence of job executions.

Figure 11:
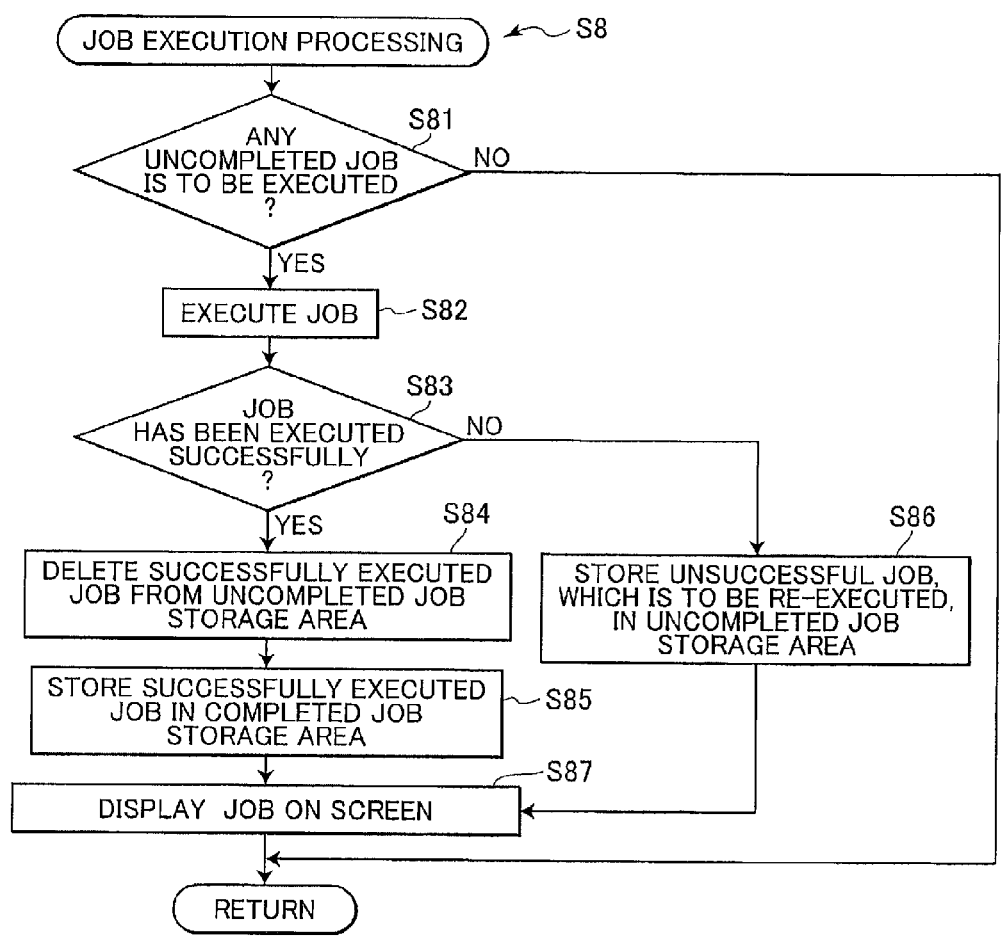
FIG. 11 is a flowchart showing the execution processing of an uncompleted job.

Next, the execution processing for the uncompleted jobs in S8 of FIG. 4 will be described with reference to FIG. 10 through 12. As shown in FIG. 4, a job is executed after the sequence change of job, the stop of job and processing of facsimile retransmission have been executed. FIG. 11 is a flowchart showing the execution processing of an uncompleted job. FIG. 12 is a view showing the liquid crystal display 41 during a job execution processing.

In S81 of FIG. 11, the CPU 21 determines whether or not any uncompleted job waiting to be executed exists. When determined that an uncompleted job exists (S81: YES), the CPU 21 advance to S82. While, when determined that any uncompleted job does not exist (S81: NO), the job execution processing is ended.

When the execution for "1 FAX O Johnson" in the uncompleted job display field in FIG. 10 is started (S82), as shown in FIG. 10, the CPU 21 drives the LCD controller 28 to display "1 FAX In Execution O Johnson" and a plurality of arrows. The plurality of arrows change the colors thereof one by one as the execution of the job proceeds. Therefore, the user can confirm the execution status of the job visually.

Subsequently, in S83 of FIG. 11, the CPU 21 determines whether or not the execution of "1 FAX O Johnson" has become successful. When determined that the execution has become successful (S83: YES), the CPU 21 advances to S84. In S84 the CPU 21 deletes the successfully executed job from the uncompleted job storage area 23A and, and in S85 the CPU 21 stores the successfully executed job as a completed job to the completed job storage area 23B. Further, the CPU 21 drives the LCD controller 20 to display the successfully executed job on the completed job display field. Concurrently, in S87 the executed job is deleted from the uncompleted job display field and other uncompleted jobs are moved up one by one on the uncompleted job display field.

On the other hand, when determined that the execution of the job has become unsuccessful (S83: NO), the CPU 21 advances to S86. In S86 the CPU 21 stores the unsuccessful job, which is to be re-executed, to the uncompleted job storage area 23A. Subsequently, as shown in FIG. 12, the CPU 21 drives the LCD controller 28 to display "2 FAX Re-1 O Johnson" in the uncompleted job display field for re-executing the unsuccessful job. Herein, the display "Re-1" indicates a first re-execution for re-executing the unsuccessful job. In the present embodiment, the re-execution job is automatically inserted closely behind a job to be executed next time. However, the re-execution job may be inserted behind the last one of uncompleted jobs waiting to be executed.

As described above, since both of the uncompleted jobs and completed jobs can be displayed simultaneously in the image processing device 1 of the present embodiment, the execution status of the jobs accumulated in the image processing device 1 can be confirmed at one time in real time. In particular, when a plurality of destinations have been designated for one image information as in the case of multicast facsimile transmission, destinations, to which the image information has been already transmitted, and destinations, to which the image information has not been transmitted yet, can be confirmed at the same time. Further, when an unsuccessful job is re-executed, the re-execution can be confirmed in real time.

Next, a sequence change processing for the uncompleted jobs of S3 in FIG. 4 will be described with reference to FIGS. 13 through 15. FIG. 13 is a flowchart showing the sequence change processing of the uncompleted jobs. FIG. 14 is a view showing the liquid crystal display 41 after an uncompleted job for changing the execution sequence has been selected. FIG. 15 is a view showing the liquid crystal display 41 after the sequence change processing has been executed.

FIG. 14 shows a list of uncompleted jobs when the execution of other uncompleted jobs is interrupted due to "2 FAX Re-2 O Johnson" which is an unsuccessful job. In the state in FIG. 14, when a user desires to process other uncompleted jobs earlier than "2 FAX Re-2 O Johnson", in S51 of FIG. 13, the user pushes down the cursor key 40B to move the cursor to "2 FAX Re-2 O Johnson".

Subsequently, in S52 the CPU 21 determines whether or not the decision key 40F has been pushed down. When determined that the decision key 40F has not been pushed down (S52: NO), the CPU 21 returns to S51. On the other hand, when determined that the decision key 40F has been pushed down (S52: YES), in S53 the CPU 21 drives the LCD controller 28 to display that "2 FAX Re-2 O Johnson" has been selected by highlighting the display of "2 FAX Re-2 O Johnson" or changing the ground color of "2 FAX Re-2 O Johnson" as shown in FIG. 14.

Next, in S54 the user pushes down the cursor key 40B to move "2 FAX Re-2 O Johnson" to the end of the execution sequence of the uncompleted jobs and to select an insertion position. Subsequently, in S55 the CPU 21 determines whether or not the decision key 40F has been pushed down. When determined that the decision key 40F has not been pushed down (S55: NO), the CPU 21 returns to S54. On the other hand, when determined that the decision key 40F has been pushed down (S55: YES), the CPU 21 fixes the sequence change of the uncompleted jobs. At this time, as shown in FIG. 15, the CPU 21 drives the LCD controller 28 to display "2 FAX Re-2 Egawa O" at the lowermost position of the uncompleted job display field and to end the changing for the ground color of "2 FAX Re-2 O Johnson". At the same time, in S56 another uncompleted jobs are displayed with being moved up one by one in the execution sequence. Then, the CPU 21 ends the sequence change processing for the uncompleted jobs As described above, in the present embodiment, the sequence of the uncompleted jobs can be changed with both of the uncompleted jobs and completed jobs being displayed at the same time on the liquid crystal display 41. Therefore, the execution sequence of the uncompleted jobs can be changed while the execution status of the jobs is confirmed with reference to the completed jobs. In particular, as shown in FIGS. 12, 14, and 15, when the user desires to transmit a plurality of jobs to be executed preferentially such as multicast facsimile transmission to ▼▼ Williams, OO Smith, Electronics Store Tokyo Branch, OO Noodle Shop, a sequence of the plurality of jobs other than the job transmitting to ▼▼ Williams can be prioritized with being confirmed that the facsimile transmission to ▼▼ Williams has been completed.

Figures 16, 17:
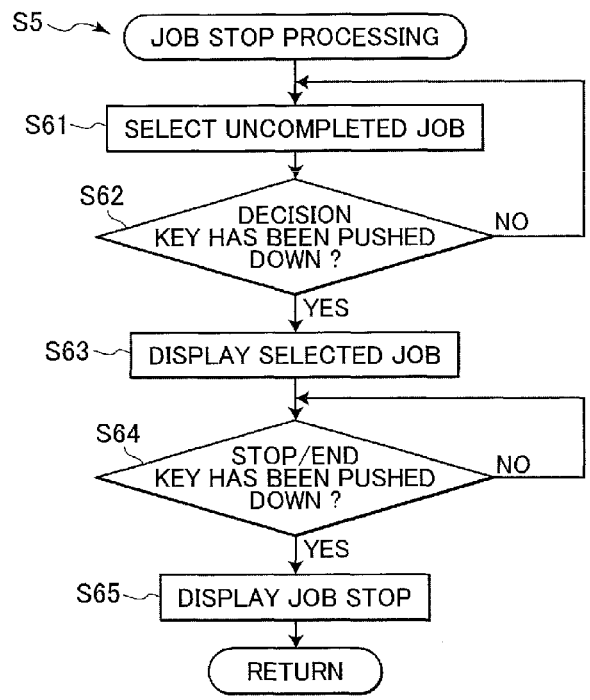
FIG. 16 is a flowchart showing a stop processing for the uncompleted job shown in FIG. 4.
FIG. 17 is a view showing the liquid crystal display after a job for stopping the execution has been selected.
Figures 18, 19:
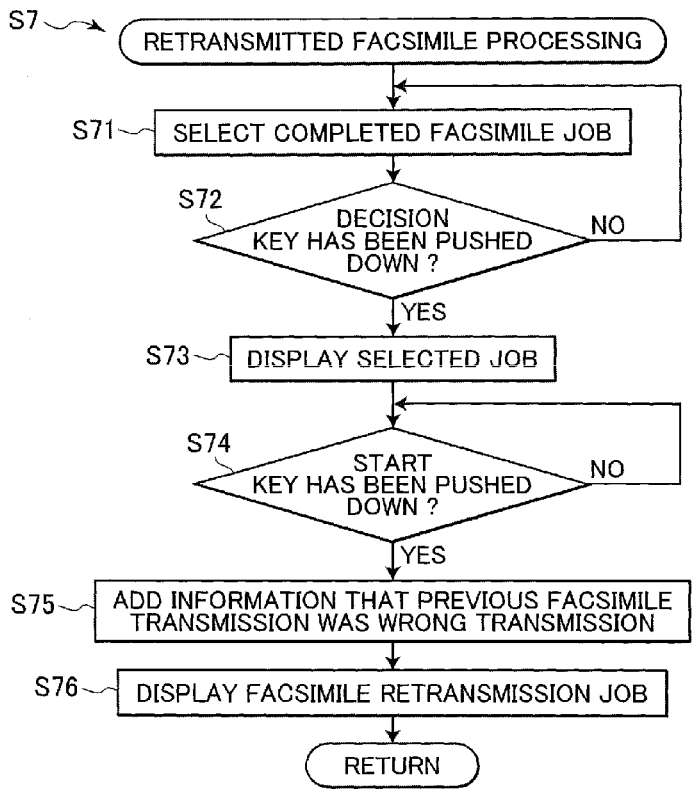
FIG. 18 is a view showing the liquid crystal display after the execution of the job has been stopped.
FIG. 19 is a flowchart showing a retransmission processing of a completed job of a facsimile shown in FIG. 4.

Next, a stop processing for the uncompleted job in S5 of FIG. 4 will be described with reference to FIGS. 16 through 18. FIG. 16 is a flowchart showing the stop processing for the uncompleted job. FIG. 17 is a view showing the liquid crystal display 41 after a job for stopping the execution of facsimile transmission has been selected. FIG. 18 is a view showing the liquid crystal display 41 after the execution of facsimile transmission for the uncompleted job has been stopped.

Suppose, for example, the user has found out that a facsimile job in execution is a wrong transmission on the liquid crystal display 41 shown in FIG. 17. When the user desires to stop the executions of "2 FAX Electronics Store Tokyo Branch" and "3 FAX Noodle Shop OO" having the same document as the active "1 FAX Ando OO" displayed in the list of the uncompleted jobs, in S61 of FIG. 16, the user pushes down the cursor key 40B to move the cursor to "2 FAX Electronics Store Tokyo Branch".

Subsequently, in S62 the CPU 21 determines whether or not the decision key 40F has been pushed down. When determined that the decision key 40F has not been pushed down (S62: NO), the CPU 21 returns to S61. On the other hand, when determined that the decision key 40F has been pushed down (S62: YES), in S63 the CPU 21 drives the LCD controller 28 to display that the uncompleted job has been selected by highlighting the display of "2 FAX Electronics Store Tokyo Branch" or changing the ground color shown in FIG. 17.

Subsequently, in S64 the CPU 21 determines whether or not the stop/end key 40C has been pushed down. When determined that the stop/end key 40C has not been pushed down (S64: NO), the CPU 21 repeats the determination whether or not the stop/end key 40C has been pushed down (S64). On the other hand, when determined that the stop/end key 40C has been pushed down (S64: YES), the CPU 21 advances to S65. In S65 the CPU 21 deletes "2 FAX Electronics Store Tokyo Branch" from the uncompleted job storage area 23A and drives the LCD controller 28 to delete the uncompleted job ("2 FAX Electronics Store Tokyo Branch") from the uncompleted job display field as shown in FIG. 18. At the same time the remaining uncompleted jobs are displayed with being moved up in execution sequence. Then, The CPU 21 ends the stop processing for the uncompleted job.

As described above, in the present embodiment, the execution of an uncompleted job can be stopped with both of the uncompleted jobs and completed jobs being displayed at the same time on the liquid crystal display 41. Therefore, the execution of the uncompleted job can be stopped with the completed jobs and the destinations of the uncompleted jobs being confirmed. Accordingly, if the user desires to discard the previous scanned image information and to transmit new image information, the user can rapidly designate new output destinations to which the new image information is to be transmitted.

Figure 20:
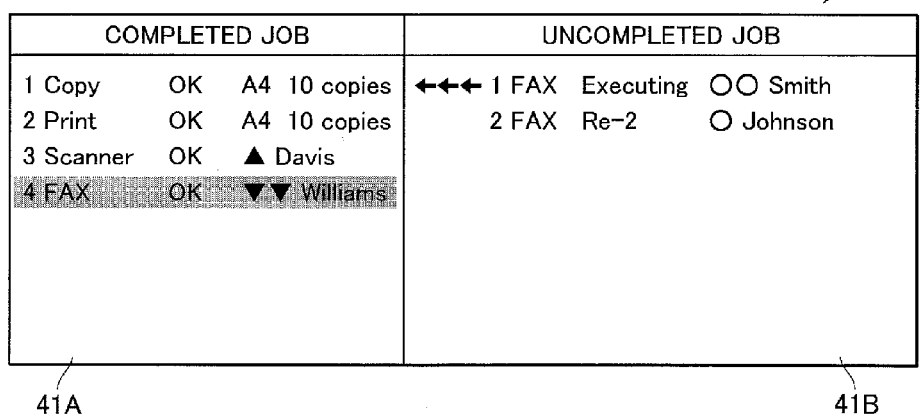
FIG. 20 is a view showing the liquid crystal display after the completed job of a facsimile to be retransmitted has been selected.
Figure 21:
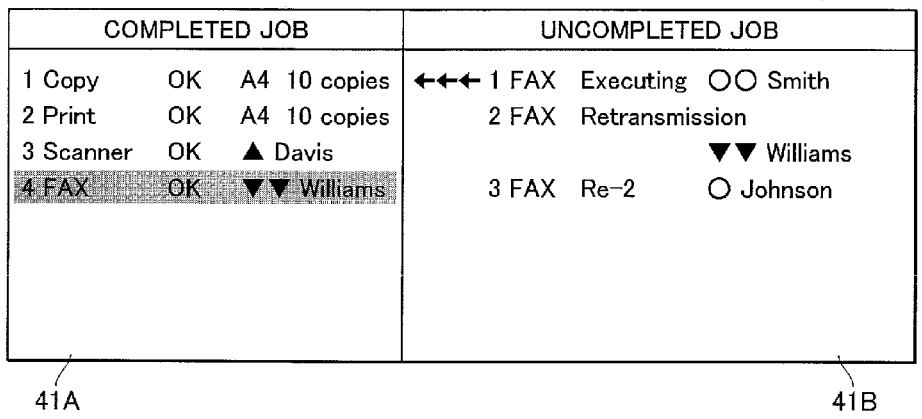
FIG. 21 is a view showing the liquid crystal display after the retransmission of the completed job of the facsimile has been designated.

Next, a retransmission processing for the completed job in S7 of FIG. 4 will be described with reference to FIGS. 19 through 21. FIG. 19 is a flowchart showing the retransmission processing of a completed job of a facsimile. FIG. 20 is a view showing the liquid crystal display 41 after a completed job of a facsimile to be retransmitted has been selected. FIG. 21 is a view showing the liquid crystal display 41 after a retransmission of the completed job of the facsimile has been designated.

Suppose, for example, the user has found out that the transmission to "5 FAX OK Williams" displayed in the list of the completed job is a wrong transmission on the liquid crystal display 41 shown in FIG. 18 and desires to designate the transmission to "5 FAX OK Williams" as the wrong transmission. In S71 of FIG. 19, the user pushes down the cursor key 40B to select the destination of a completed facsimile. Subsequently, in S72 the CPU 21 determines whether or not the decision key 40F has been pushed down. When determined that the decision key 40F has not been pushed down (S72: NO), the CPU 21 returns to S71. On the other hand, when determined that the decision key 40F has been pushed down (S72: YES), the CPU advances to S73. In S73 the CPU 21 drives the LCD controller 28 to change the ground color of "5 FAX OK TV Williams" as shown in FIG. 20.

Subsequently, in S74 the CPU 21 determines whether or not the start key 40D has been pushed down. When determined that the decision key 40F has been pushed down (S74: YES), the CPU 21 advances to S75. In S75 the CPU 21 adds information indicating that the previous facsimile transmission was the wrong transmission. This information gives to the destination that the previous facsimile transmission was the wrong transmission and is therefore to be discarded. This information may be stored as default in advance in the RAM 23, or the user may set the content of the information to store in the RAM 23. On the other hand, when determined that the start key 40D has not been pushed down (S74: NO), the CPU 21 repeats the determination whether or not the start key 40D has been pushed down (S74).

Next, in S76 the CPU 21 stores a retransmission job of the facsimile to the uncompleted job storage area 23A and drives the LCD controller 28 to display the retransmission job of the facsimile next to the job in execution displayed in the list of the uncompleted jobs as shown in FIG. 21. Then, The CPU 21 ends the retransmission processing for the completed jobs.

As described above, in the present embodiment, a completed facsimile job can be retransmitted with both of the uncompleted jobs and completed jobs being displayed at the same time on the liquid crystal display 41. Therefore, a person who has received the information being added to the retransmission facsimile can recognize that the previous facsimile transmission was the wrong transmission and can discard the previous facsimile rapidly.

Moreover, if the retransmission processing for the completed job is combined to the stop processing for the uncompleted job, the user can instruct both the retransmission of the completed facsimile job and the execution stop of the uncompleted facsimile job simultaneously on the same screen. In this respect, the present embodiment can improve operability efficiency.

Although the present invention has been described with reference to the preferred embodiment, the present invention is not limited to the above embodiment and, evidently, a variety of modifications and changes may be made without departing from the scope of the present invention. For example, in the present embodiment, in particular the sequence change of job, stop of job and re-execution of job are executed in the multicast facsimile transmission (the facsimile job). However, the sequence change of job, stop of job and re-execution of job can be executed in the copy job and the scanner job. Moreover, the operations by a user such as the sequence change of job, stop of job and re-execution of job are not limited to the present embodiment. The sequence change of job, stop of job and re-execution of job may be designated by providing a job sequence change button, a job stop button, a job re-execution button newly on the operation panel 4 and pushing down the buttons.

What is claimed is:

1. An image processing device for executing a facsimile job that outputs image information to a destination, comprising:
   a scanning unit configured to scan an original for executing the facsimile job;
   a display comprising a first region and a second region and disposed at a front portion of the scanning unit, wherein the first region and the second region are arranged along a front end of the scanning unit;
   a first memory for storing, as an uncompleted facsimile job, a facsimile job before execution;
   a second memory for storing, as a completed facsimile job, the uncompleted facsimile job after the uncompleted facsimile job has been executed; and
   a first display control unit configured to display both uncompleted facsimile jobs stored in the first memory and completed facsimile jobs stored in the second memory on the display simultaneously, the first display control unit being configured to display an arrow pointing toward the second region and oriented along the front end of the scanning unit, the arrow being positioned near the second region in a portion of the first region displaying the uncompleted facsimile job being executed, while one of the uncompleted facsimile jobs is executing, such that
   the uncompleted facsimile jobs, which correspond to originals scanned by the scanning unit and are to be sent, are displayed only on the first region and one of the uncompleted facsimile jobs is shifted in a first direction from another of the uncompleted facsimile jobs, the completed facsimile jobs, which correspond to originals scanned by the scanning unit and have been sent, are displayed only on the second region and one of the completed facsimile jobs is shifted in the first direction from another of the completed facsimile jobs, and the uncompleted facsimile jobs displayed on the first region are shifted from the completed facsimile jobs displayed on the second region in a second direction orthogonal to the first direction.

2. The image processing device according to claim 1, further comprising:
   a third memory for storing a plurality of destinations to which the image information is outputted;
   a second display control unit that displays the plurality of destinations on the display; and
   a first designating unit that designates at least one destination from the plurality of destinations displayed on the display,
   wherein the second display control unit displays both the plurality of destinations and the at least one destination designated by the first designating unit simultaneously,
   wherein the first memory stores at least one uncompleted facsimile job for outputting image information to the at least one destination, and
   wherein the first display control unit displays both the at least one uncompleted facsimile job and the completed facsimile job on the display simultaneously after the second display control unit displays both the plurality of destinations and the at least one destination.

3. The image processing device according to claim 2,
   wherein the first designating unit designates a target destination from the plurality of destinations,
   wherein the second display control unit changes a portion of the display where the target destination is displayed after the target destination has been designated by the first designating unit.

4. The image processing device according to claim 2, wherein the second display control unit divides the display into a first region and a second region, the plurality of destinations being displayed on the first region, the designated destination by the first designating unit being displayed on the second region.

5. The image processing device according to claim 2, further comprising a sequence changing unit that changes an execution sequence of more than one uncompleted facsimile jobs wherein the first memory stores more than one uncompleted facsimile jobs for outputting image information to more than one destinations in the plurality of destinations, wherein first display control unit displays more than one uncompleted facsimile job based on the execution sequence thereof.

6. The image processing device according to claim 5, further comprising a second designating unit that designates a target uncompleted facsimile job for changing the execution sequence from the more than one uncompleted facsimile job displayed on the display, wherein the first display unit changes a portion of the display where the target uncompleted facsimile job is displayed after the target uncompleted facsimile job has been designated by the second designating unit.

7. The image processing device according to claim 1, further comprising a re-execution unit that re-executes the completed facsimile job together with adding information indicating that the completed facsimile job is a wrong facsimile job.

8. The image processing device according to claim 7, further comprising a second designating unit that designates a target completed facsimile job for re-executing from the completed facsimile job displayed on the display, wherein the first display unit changes a portion of the display where the target completed facsimile job is displayed after the target completed facsimile job has been designated by the second designating unit.

9. The image processing device according to claim 1, further comprising a stop unit that stops the uncompleted facsimile job to be executed.

10. The image processing device according to claim 9, further comprising a second designating unit that designates a target uncompleted facsimile job for stopping execution from the uncompleted facsimile job displayed on the display, wherein the first display unit changes a portion of the display where the target uncompleted facsimile job is displayed after the target uncompleted facsimile job has been designated by the second designating unit.

11. The image processing device according to claim 1, wherein the first region is adjacent to the second region.

12. The image processing device according to claim 1, wherein the display has a rectangle shape having a longitudinal direction, and wherein the first display control unit divides the display into the first region and the second region in half in the longitudinal direction.

13. The image processing device according to claim 1, wherein the first region is the same size as the second region.

* * * * *